(12) United States Patent
Inoue

(10) Patent No.: US 7,445,161 B2
(45) Date of Patent: Nov. 4, 2008

(54) THERMOSTAT

(75) Inventor: Fujio Inoue, Kiyose (JP)

(73) Assignee: Nippon Thermostat Co., Ltd., Kiyose (JP)

( * ) Notice: Subject to any disclaimer, the term of this patent is extended or adjusted under 35 U.S.C. 154(b) by 520 days.

(21) Appl. No.: 10/518,087

(22) PCT Filed: Jan. 26, 2004

(86) PCT No.: PCT/JP2004/000670

§ 371 (c)(1),
(2), (4) Date: Dec. 16, 2004

(87) PCT Pub. No.: WO2004/090404

PCT Pub. Date: Oct. 21, 2004

(65) Prior Publication Data

US 2005/0224592 A1    Oct. 13, 2005

(30) Foreign Application Priority Data

Apr. 4, 2003    (JP) .............................. 2003-101696

(51) Int. Cl.
*G05D 23/02* (2006.01)
*G05D 23/00* (2006.01)
*F01P 7/02* (2006.01)

(52) U.S. Cl. ................. 236/101 C; 236/93 R; 236/34.5

(58) Field of Classification Search ............. 236/101 R, 236/93 R, 101 C, 34, 34.5; 137/467; 123/41.08, 123/41.09, 41.1
See application file for complete search history.

(56) References Cited

U.S. PATENT DOCUMENTS 4,875,437 A    10/1989    Cook et al.

5,482,010 A    1/1996    Lemberger et al.

FOREIGN PATENT DOCUMENTS

| JP | 56-29017 | 3/1981 |
|---|---|---|
| JP | 43928/1986 | 3/1986 |
| JP | 2-146219 | 6/1990 |
| JP | 6-39190 | 10/1994 |
| JP | 7-27250 | 1/1995 |
| JP | 7-305787 | 11/1995 |
| JP | 10-339136 | 12/1998 |
| JP | 2000-136723 | 5/2000 |

*Primary Examiner*—Chen-Wen Jiang
(74) *Attorney, Agent, or Firm*—Oblon, Spivak, McClelland, Maier & Neustadt, P.C.

(57) ABSTRACT

The object of the present invention is to obtain a thermostat device capable of improving the workability and assemblability, reducing costs, and downsizing the entire device with a minimum number of components. This thermostat device has a first valve disc 22 for opening and closing a first fluid passage 3b, and a second valve disc 23 for opening and closing a second fluid passage 3d, and constituted so as to open either the first fluid channel or second fluid channel and close the other by making the valve discs move integrally in conjunction with the operation of an operating member 21 in accordance with the temperature change of the fluid. The operating member has a case 31 which seals in one end side thereof a thermal expansion body 32 having a property of expanding and contracting in accordance with a temperature change, and retains a piston 33 from the opening of the other end side thereof in a freely reciprocable manner. The outward flange unit 36 provided to the opening on the other end side of the case is made to be the first valve disc.

4 Claims, 7 Drawing Sheets

THERMOSTAT

TECHNICAL FIELD

The present invention relates to a thermostat device, which is a temperature-sensing automatic valve, to be used for controlling the coolant temperature by operating in accordance with the temperature change of the coolant and switching the flow of the engine coolant in an engine coolant circuit for circulating a coolant, which is used for cooling the internal combustion engine (hereinafter referred to as engine) used in automobiles and the like, between a cooling unit (hereinafter referred to as a radiator).

BACKGROUND ART

In an automobile engine, a cold-water cooling system employing a radiator is generally used for cooling such [engine]. From the past, in order to control the temperature of the coolant to be introduced into the engine in this type of cooling system, a thermostat employing a thermal expansion body for adjusting the amount of coolant to be circulated on the radiator side, or a valve unit for electrically controlling the same, is being used.

In other words, the thermostat employing the thermal expansion body or the control valve formed from the likes of an electrical control valve unit described above is installed to a part of the coolant passage; for instance, to the inlet side or the outlet side of the engine, and, when the coolant temperature is low, the control valve is closed to circulate the coolant via a bypass channel without passing through the radiator, and, when the coolant temperature becomes high, the control valve is opened to circulate the coolant through the radiator so as to control the coolant temperature to be a required state.

The overall schematic of an automobile engine cooling system (coolant temperature control system) employing a thermostat is now explained with reference to FIG. 6.

In FIG. 6, reference numeral 1 represents an automobile engine as the internal combustion engine constituted with a cylinder block and cylinder head, and a coolant passage represented with arrow a is formed inside the cylinder block and cylinder head of this engine 1.

Reference numeral 2 represents a cooling unit, or a radiator, and a coolant passage is formed in this radiator 2 as universally known. A coolant inlet 2a and a coolant outlet 2b of the radiator 2 are connected with a coolant circuit 3 for circulating the coolant in the engine 1.

This coolant circuit 3 is constituted of an outflow side cooling channel 3a communicating from the coolant outlet 1c provided to the engine 1 to the coolant inlet 2a provided to the radiator 2, an inflow side cooling channel 3b communicating from the coolant outlet 2b provided to the radiator 2 to the coolant inlet 1b provided to the engine 1, and a bypass channel 3c for connecting the portions in the middle of such cooling channels 3a, 3b.

The engine 1, radiator 2 and cooling channel 3 form the coolant circuit.

A thermostat device 5 for controlling the flow and amount of coolant in this kind of coolant circuit 3 according to the coolant temperature is provided [at a position] in the middle of the cooling channel 3b on the inlet side of the engine 1, and at an intersection enabling the switching control of the coolant from the radiator 2 and the bypass passage 3c. Incidentally, reference numeral 3d in the diagram represents a cooling channel leading from such intersection to the inlet 1b of the engine 1.

Further, although not shown in FIG. 6, disposed to the inlet 1b portion of the engine 1 is a water pump for coercively circulating the coolant inside the cooling channel 3 as a result of the rotational axis being rotated pursuant to the rotation of a crankshaft (not shown) of the engine 1. Further, reference numeral 6 in the diagram represents a cooling fan unit for coercively taking cool air into the radiator 2, and is constituted of a fan and an electric motor for rotationally driving such fan.

Flow of the current in this kind of coolant circuit 3 is switch-controlled with the thermostat device 5. In other words, the constitution is such that, when the coolant temperature is low, the coolant is circulated via the bypass channel 3c, and when the coolant temperature becomes high, the coolant is circulated on the radiator 2 side, and not via the bypass channel 3c, and then supplied to the engine 1.

With the thermostat device 5, as shown in FIG. 7, a first valve disc 8 is provided to one end (upper end in the drawing) of the operating member 7 which operates pursuant to the temperature change of the fluid, a second valve disc 9 is provided to the other end (lower end in the drawing) of such operating member 7, and comprises a coil spring 10, which is a biasing means, for biasing the first valve disc 8 to the valve-closing position, and a main frame 11.

The operating member 7 is a so-called thermoelement, is formed from a temperature sensor 7a and a guide unit 7b, a thermal expansion body 7c such as wax that expands and contracts upon sensing the temperature of the fluid is built in the temperature sensor 7a, and a piston rod 7d is fitted into the guide unit 7b extending from the tip of the temperature sensor 7a. Further, provided to the tip of the piston rod 7d is a pressing holder 12 for pressing down on the tip of the piston rod 7d.

The first valve disc 8 is provided to the guide unit 7b, and the pressing holder 12 is made to be the valve seat of the first valve disc 8. Further, a mounting unit 12 with a water channel is provided protrusively to the outside of the pressing holder 12. Reference numeral 12 represents packing.

The second valve disc 9 is mounted with a stopper 13a to a valve rod 13 extending from the back end of the temperature sensor 7a, and the second valve disc 9 is spring-biased toward the back end of the valve rod 13 with the coil spring 14 installed between such second valve disc 9 and temperature sensor 1a.

The coil spring 10 as the biasing means is degenerated and provided between the first valve disc 8 and frame 11 so as to constantly bias the first valve disc 8 to a valve-closing position.

With this kind of thermostat device 5, the first valve disc 8 is positioned to open and close the cooling channel 3b, and the second valve disc 9 is positioned to open and close the bypass channel 3c, and the operation thereof is as follows.

In other words, as a result of the thermal expansion body 7c inside the temperature sensor 7a expanding due to the rise in the coolant temperature and thereby pressing the piston rod 7d, the operating member 5 will operate by resisting the biasing force of the coil spring 10. As a result, the first valve disc 8 will move to an open position to release the cooling channel 3b, and the second valve disc 9 will move the valve-closing position to close the bypass channel 3c. Further, as a result of the coolant temperature falling, the thermal expansion body 7c will contract, the suppress strength of the piston rod 7d will weaken, the first valve disc 2 will move to the valve-closing position due to the biasing force of the coil spring 10 to close the water channel 3b, and the second valve disc 9 will move to the valve-opening position to release the bypass channel 3c.

As described above, the thermostat device 5, as a temperature-sensing automatic valve, controls the temperature of the coolant to be sent to the engine water jacket 1 to be a suitable temperature by mixing and switching the heated coolant from the engine water jacket 1 and the cooled coolant from the radiator 2 inside the coolant circuit 3 of the engine.

With the thermostat device 5 having this kind of constitution, a proposal has been made in which a control plate for blocking the flow of the coolant is provided around the second valve disc 9 for opening and closing the bypass channel 3c, and, as a result of providing such a control plate, the coolant that passed through the bypass channel 3c can be smoothly guided to the temperature sensor 7a in the operating member 7, a mixing effect of the fluid is yielded in the vicinity of the operating member 7 thereby, and, by seeking the uniform temperature distribution in the vicinity of the operating member 7, the accurate control of the flow and amount of the coolant as well as superior responsiveness can be obtained (e.g., refer to Patent Document 1).

Patent Document 1:

Japanese Patent Kokai Publication No. H6-39190

With the thermostat device 5 employing a conventional structure, the bypass valve structure of the second valve disc 9 for opening and closing the bypass channel 3c is complex, and there are disadvantageous in that the number of components is numerous, assemblability is inferior, management of components is difficult, and there are problems in securing a reliable operation.

In other words, with the foregoing thermostat device 5 employing a convention structure, upon providing a first valve disc 8 to the guide unit 7b on one end of the operating member 7 as the thermoelement, the first valve disc 8 is press fitted and provided around the guide unit 7b, and it is also necessary to provide a stopper ring (i.e., C ring or E ring) to prevent such press fitting from disengaging. Thus, there were problems in that the number of components is numerous and the assemblability being inferior. Further, with this kind of structure, precision of the respective components for press fitting is required, and problems would also arise in terms of workability.

Moreover, with the foregoing conventional structure, since it is necessary to provide a valve rod 13, a second valve disc 9 to be provided with a stopper 13a to the tip of this valve rod 13, a coil spring 14 for biasing the second valve disc 9 and so on to the lower end of the operating member 7 as the thermoelement, the number of components is numerous, and the assembly was troublesome.

In addition, since the bypass valve as the second valve disc 9 is of a structure which opens and closes the opening end of the bypass channel 3c inside the housing, it is necessary to appropriately set the length of the valve rod 13 and the shape of the second valve disc 9 depending on the size or shape of the housing, and this will complicate the management of components and cause increased costs.

Further, with Patent Document 1 described above, since the precision of the temperature sensor 7a is secured by mixing the coolant, it is necessary to provide a control plate, and there is a problem in that the number of components will increase even more.

DISCLOSURE OF THE INVENTION

The present invention was devised in light of the foregoing circumstances, and an object thereof is to review the overall structure of a thermostat device for controlling and circulating the coolant according to the coolant temperature in an engine cooling system, for example, and to obtain a thermostat device capable of reducing the number of components, improving the assemblability and workability, reducing costs, and exhibiting the performance as a thermostat.

In order to achieve the foregoing object, a thermostat device pertaining to an embodiment of the present invention comprises a first valve disc for opening and closing a first fluid channel, and a second valve disc for opening and closing a second fluid channel, and constituted so as to open either the first fluid channel or second fluid channel and close the other by making the valve discs move integrally in conjunction with the operation of an operating member in accordance with the temperature change of the fluid, wherein the operating member has a case which seals in one end side thereof a thermal expansion body having a property of expanding and contracting in accordance with a temperature change, and retains a piston from the opening of the other end side thereof in a freely reciprocable manner, and an outward flange unit provided to the opening on the other end side of the case is made to be the first valve disc.

According to a thermostat pertaining to another embodiment of the present invention, the outward flange unit to be the first valve disc is integrally formed in the case of the operating member.

According to a thermostat pertaining to yet another embodiment of the present invention, the outward flange unit to be the first valve disc is formed with a flange-shaped member provided integrally to a part of the case of the operating member.

According to a thermostat pertaining to yet another embodiment of the present invention, the flange-shaped member is welded and fixed to a part of the case.

A thermostat device pertaining to yet another embodiment of the present invention comprises a first valve disc for opening and closing a first fluid channel, and a second valve disc for opening and closing a second fluid channel, and constituted so as to open either the first fluid channel or second fluid channel and close the other by making the valve discs move integrally in conjunction with the operation of an operating member in accordance with the temperature change of the fluid, wherein the operating member has a case which seals in one end side thereof a thermal expansion body having a property of expanding and contracting in accordance with a temperature change, and retains a piston from the opening of the other end side thereof in a freely reciprocable manner, a cylindrical portion for retaining one end of the case constituting the operating member in a freely slidable manner is provided to the main frame of the thermostat device, an opening to be opened and closed at one end of the case is provided to a part of the cylindrical portion, and one end of the case is made to be the second valve disc.

According to a thermostat pertaining to yet another embodiment of the present invention, the tip of the cylindrical portion is made to face the inside of the passage constituting the second fluid channel, and the inside of the cylindrical portion is made to be a part of the second fluid channel.

According to a thermostat pertaining to yet another embodiment of the present invention, one end of the operating member is a temperature sensor for making the operating member operate in accordance with the temperature of the fluid.

According to a thermostat pertaining to yet another embodiment of the present invention, the operating member comprises: a piston which is disposed along the axial direction inside the case which the internal end thereof faces the inside of the thermal expansion body and the external end thereof protrudes outward from the opening of the other end side of the case, thereby reciprocates in accordance with the expansion and contraction of the thermal expansion body; a guide member disposed at the other end side inside the case for retaining the piston in a freely slidable manner; and a seal member disposed at the internal end of the guide member inside the case for sealing the thermal expansion body in the other end side inside the case; wherein the case is formed as a hollow container which has a substantially bottomed cylindrical shape having an opening for inserting the guide member, and a bottomed portion having a spherical inner peripheral face formed at an end opposite to the opening, the guide member has a through hole on the axis line, and the outer peripheral portion thereof is resin-molded in the shape of the inner peripheral shape of the case, and the seal member is interposed between the internal end of the guide member and the thermal expansion body inside the case.

According to a thermostat pertaining to yet another embodiment of the present invention, the case is a hollow container with a bottomed cylindrical shape having a substantially identical diameter size, the case is constituted so that the thermal expansion body is charged in the bottomed portion side inside the case, the guide member which the internal end thereof faces the thermal expansion body via the seal member is inserted from the case opening, and the guide member is installed in the inside of the case to be positioned with a locking member provided integrally to the opening of the case.

According to yet another embodiment of the present invention, since the outward flange unit provided to the opening end of the case constituting the operating member is used as the first valve disc for opening and closing the first fluid channel (main passage), in comparison to the conventional structure, the number of components is few, the assemblability and workability are superior, and costs can be reduced significantly.

According to yet another embodiment of the present invention, since the valve for opening and closing the second fluid channel (bypass channel) is constituted with a frame of the thermostat and the thermoelement, the number of components is few, the assemblability and workability are superior, and costs can be reduced.

Further, according to yet another embodiment of the present invention, since the valve for opening and closing the second fluid channel (bypass channel) is constituted with a cylindrical portion provided integrally with the device frame, and the tip of the cylindrical portion is connected to the bypass channel such that the fluid from the second fluid channel will only flow inward (or outward) inside the cylindrical portion, the fluid pressure caused by the fluid flow to be added from the lateral direction to the operating member will be small, and biased abrasion can be reduced.

Moreover, according to yet another embodiment of the present invention, since the fluid passing through the foregoing valve portion will always pass through the temperature sensor, the fluid will be mixed reliably, and, since the required temperature can be sensed, a disadvantage such as temperature hunting can be avoided, and the fluid temperature can be controlled in a required state. In addition, since the flow of fluid can be controlled with the cylindrical portion, the control plate employed in foregoing Patent Document 1 is no longer required, and the number of components can be reduced thereby.

According to yet another embodiment of the present invention, in addition to being able to simplify the structure of the thermoelement and reduce the number of components, since the first valve disc is directly provided to the thermoelement via welding or the like, the processing precision of the respective components can be secured, and it is also possible to seek the reduction of the number of components, improvement in the assemblability and workability, and reduction of costs.

BEST MODE FOR CARRYING OUT THE INVENTION

FIG. 1 to FIG. 5 show an embodiment of the thermostatic device pertaining to the present invention, and, in the present embodiment, explained is a case of the [thermostat device] being provided to the inlet side of the engine in an engine cooling system for controlling the coolant temperature.

Figure 2:
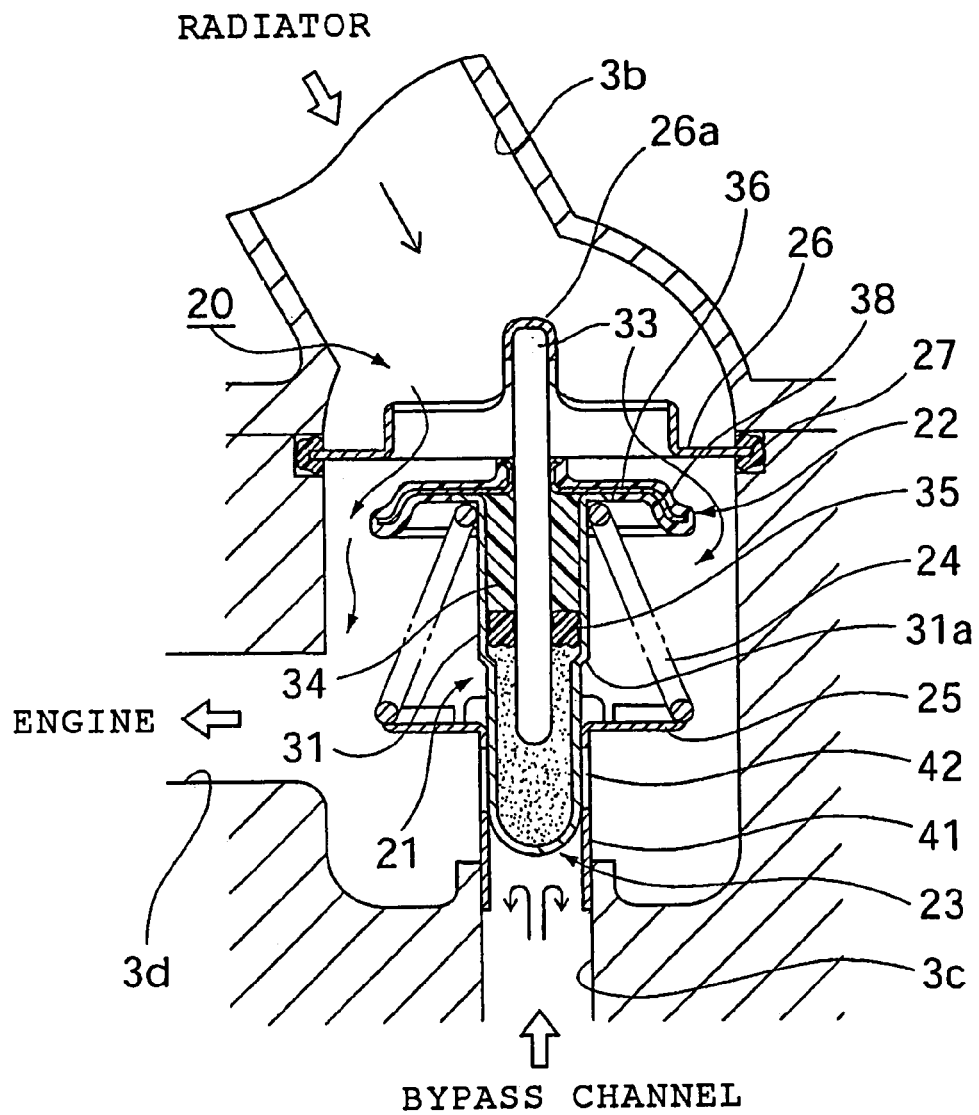
FIG. 2 shows a state where the thermostat illustrated in FIG. 1 is built in the coolant circuit of the engine, and is a sectional side view showing a state where the first valve on the radiator side is opened, and the second value on the bypass channel side is closed.
Figure 6:
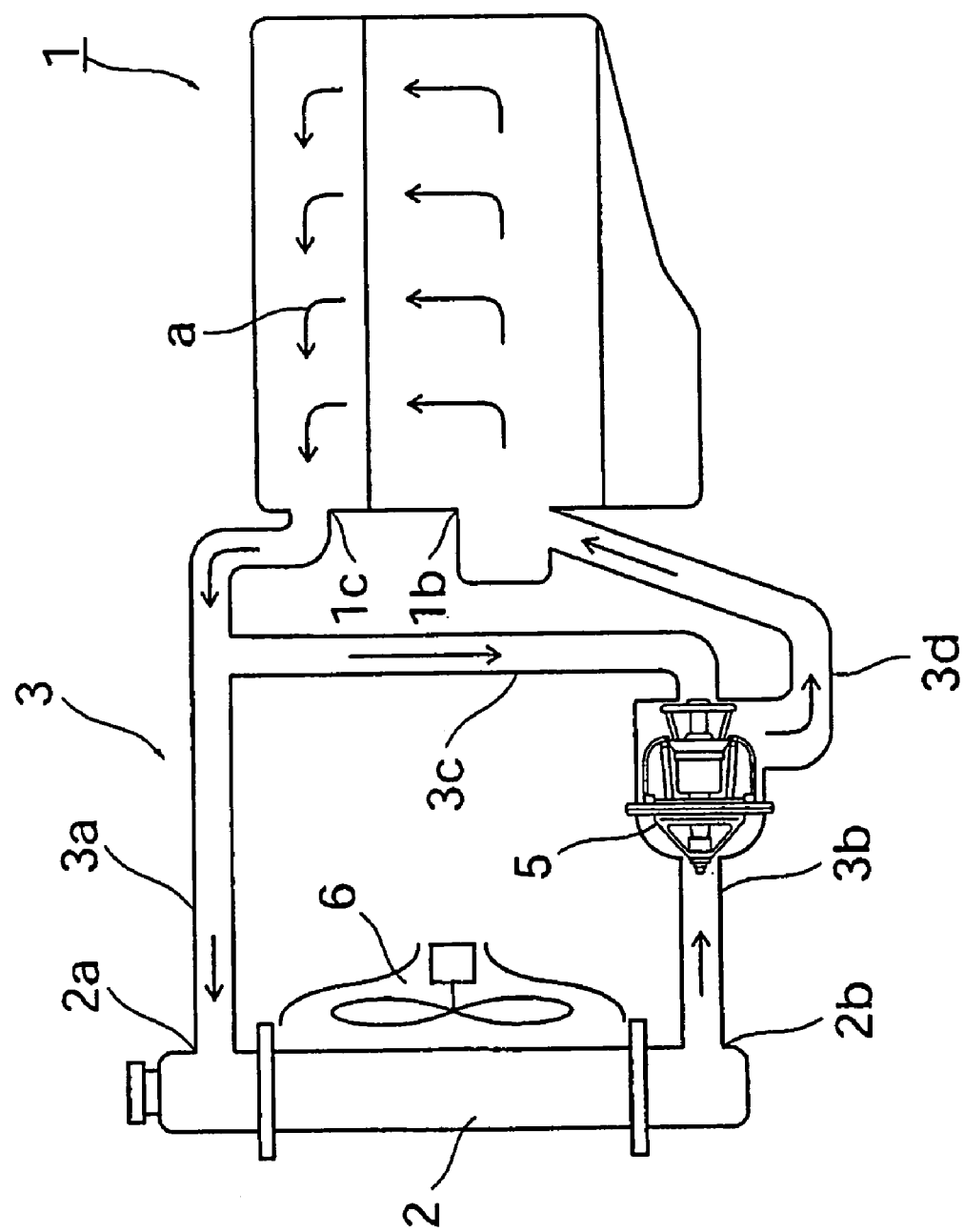
FIG. 6 is an explanatory diagram showing the engine coolant circuit in which the thermostat device is built in the inlet side of the engine.
Figure 7:
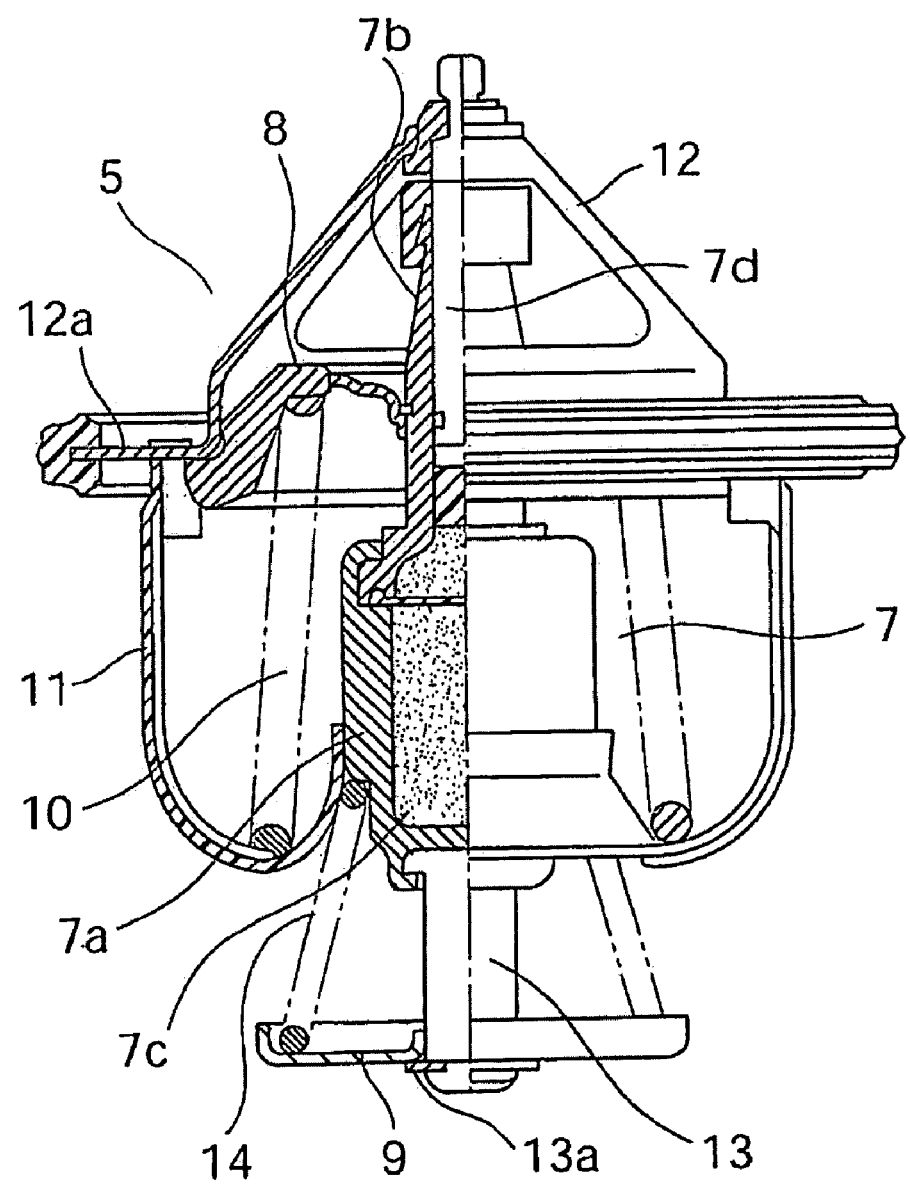
FIG. 7 is a cross section of the relevant part for explaining an example of a conventional thermostat device.

In these diagrams, the thermostat device, which is a temperature-sensing automatic valve, represented with reference numeral 20, as evident from FIG. 2 and FIG. 6 illustrating the conventional example described above, is attached at the intersection of the cooling channel 3b on the radiator 2 side, and the bypass channel 3c from the engine outlet 1c side, and is used to selectively switch the flow of the coolant in the first and second fluid channels constituted with the foregoing passages and supplying such coolant to the cooling channel 3d leading to the engine inlet 1b. Here, an explanation is provided based on the assumption that the first fluid channel leads to the cooling channel 3d from the cooling channel 3b, and the second fluid channel leads to the cooling channel 3d from the bypass channel 3c.

Figure 1:
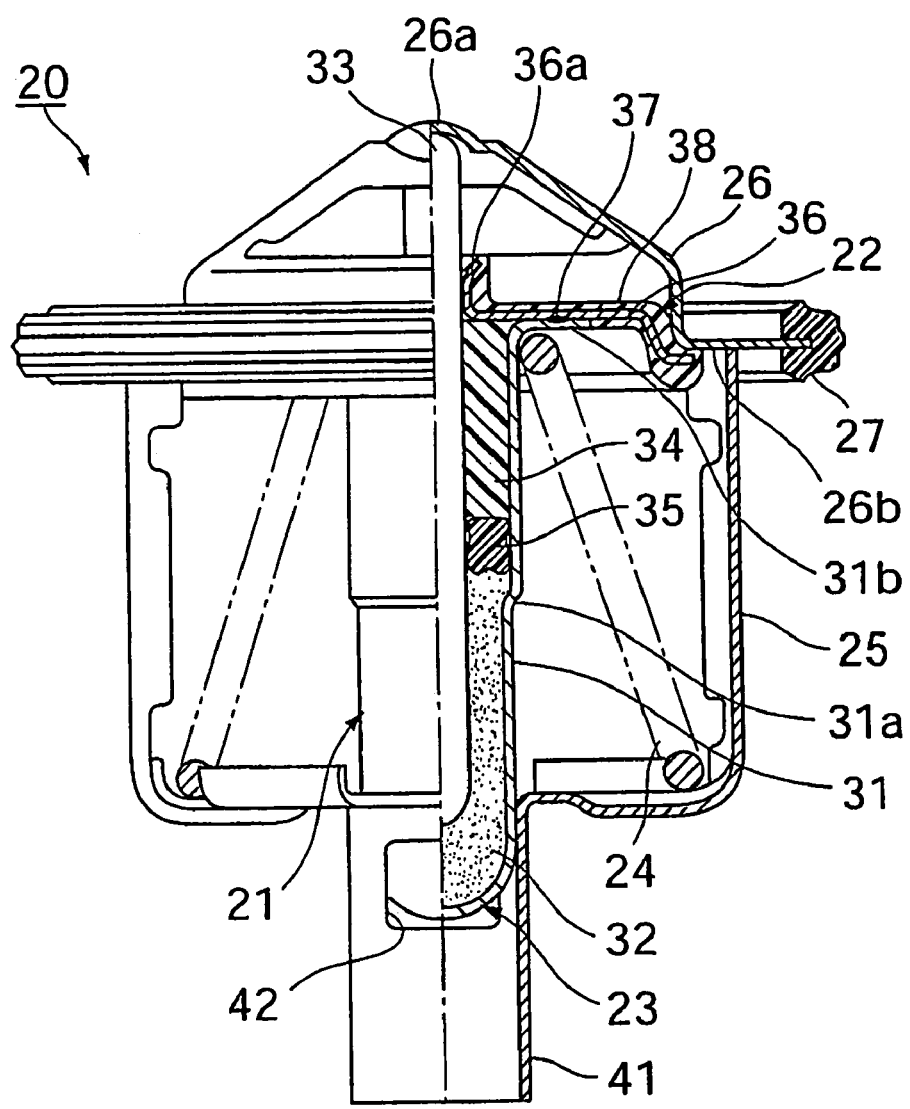
FIG. 1 shows an embodiment of the thermostat device pertaining to the present invention, and is a cross section of the relevant part for explaining the schematic constitution of the overall thermostat device.

This thermostat device 20, as shown in FIG. 1 and FIG. 2, comprises a thermoelement 21 as the operating member which operates pursuant to the temperature change in the coolant, first and second valve discs 22, 23 provided together with or integrally to the thermoelement 21 for opening and closing the first and second fluid channels, a coil spring 24 as the biasing means provided to place the first valve disc 22 to a valve-closing position and place second valve disc 23 to a valve-opening position, and a frame 25 for covering the periphery of the foregoing components.

Figure 3:
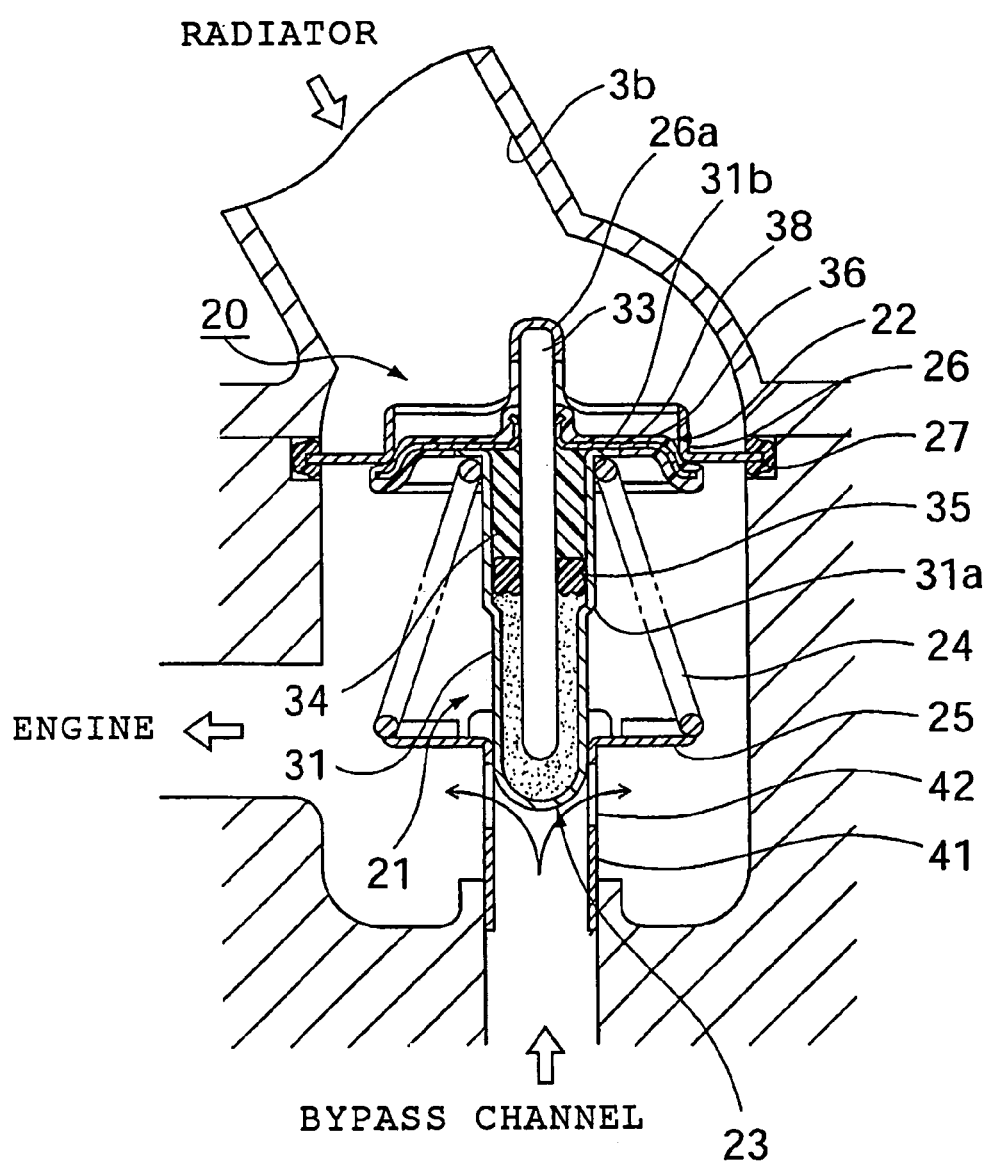
FIG. 3 is a sectional side view showing a state where, from the state depicted in FIG. 2, the first valve on the radiator side is closed, and the second valve on the bypass channel side is opened.
Figure 4:
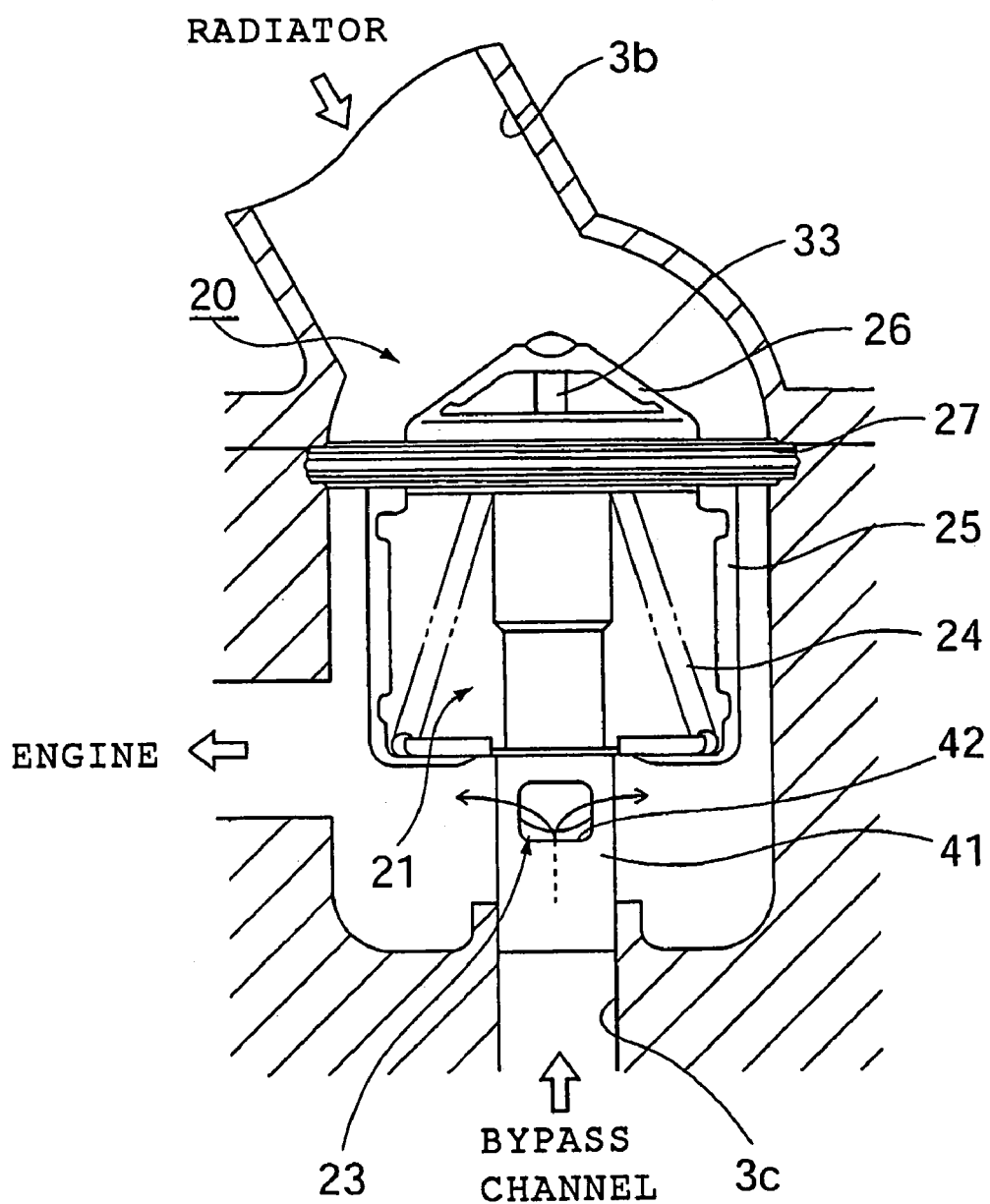
FIG. 4 is an external view viewed from the side of the thermostat device illustrated in FIG. 3.

Here, a cap 26, in which a locking portion 26a for locking the upper end of a piston of the thermoelement 21 described later is protruding upward, is linked integrally with the frame 25 at the upper part of the frame. Packing 27 is provided to the outward flange unit of this cap 26, and as shown in FIG. 2 to FIG. 4, such [outward flange unit] is locked and retained with liquid tightness at a part of the device housing. Incidentally, a valve seat 26b in relation to the first valve disc 22 is provided to the inner edge of this cap 26, and a first valve for opening and closing the flow of the coolant in the first fluid channel is thereby constituted.

Figure 5:
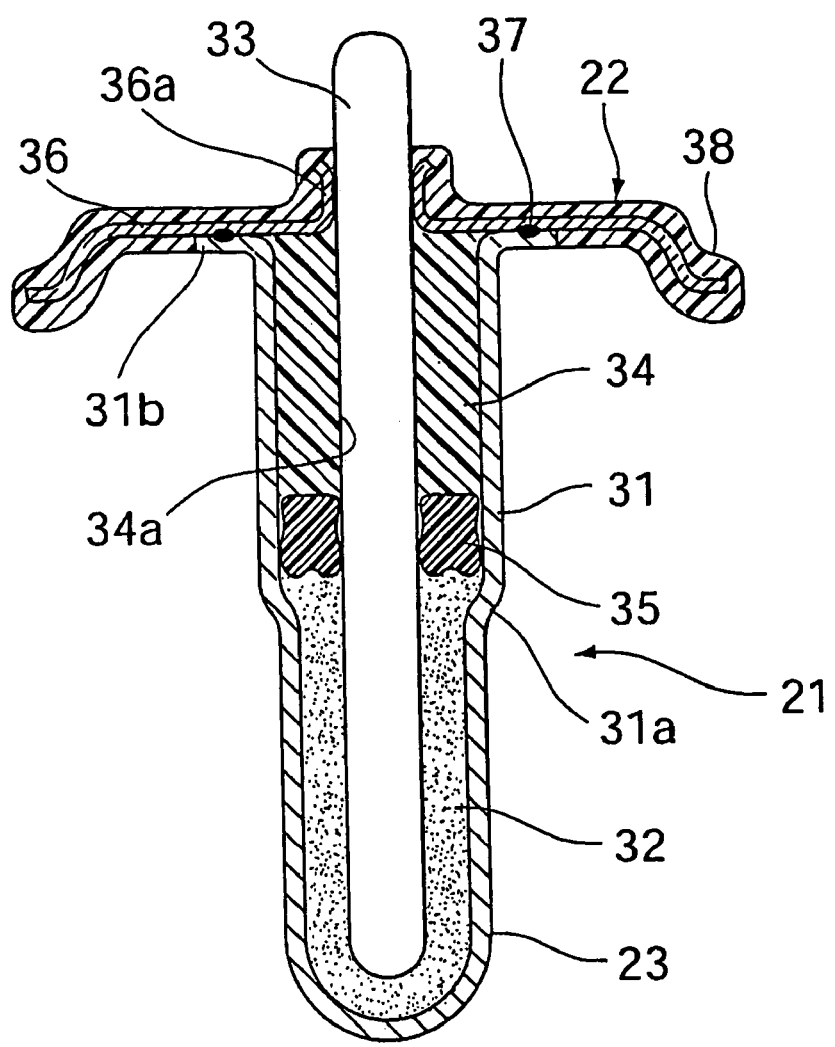
FIG. 5 is a cross section of the relevant part showing the thermoelement employing the thermostat pertaining to the present invention.

The thermoelement 21 has the constitution depicted in FIG. 5. To describe this in detail, this thermoelement 21 comprises a metal case 31 formed from a hollow container of a bottomed cylindrical shape having an approximately identical diameter size, and wax 32 as the thermal expansion body, which thermally expands and thermally contracts by being subject to thermal influence from outside the case 31, is sealed in such bottomed portion.

Here, in the present embodiment, a step portion 31a is formed at a part of the case 31 in the longitudinal direction, and the bottomed portion is formed in a small diameter, and the opening side is formed in a large diameter. This, as shown in FIG. 1 and FIG. 2, is for preventing the thermostat device 20 from falling out upon assembly thereof, and is also used for positioning the seal member 35 described later. In addition, the case 31 may be formed straight by managing the filing amount of wax 32 to be fixed.

A piston 33 is disposed along the axis line direction in this case 31, the internal end thereof faces the inside of the wax 32, and the external end thereof protrudes outwardly from the opening of the case 31 so as to enable the reciprocal motion on the axis line pursuant to the expansion and contraction of the wax 32. Incidentally, the exit motion of the piston 33 into the case 31 is conducted with the biasing force of a return spring or the like provided externally (a coil spring 24 is used in this embodiment).

In the drawings, reference numeral 34 represents a guide member for slidably retaining the piston 33, which is formed in an approximate cylindrical shape, and is internally provided by being inserted inside the case 31 from one end (opening end) thereof.

A seal member 35 for sealing the wax 32 in the bottomed portion inside the case 31 is interposed and provided at the internal end portion of the guide member 34 inside the case 31. Incidentally, reference numeral 34a in the diagrams represents a through hole for retaining the piston in a freely slidable manner.

A flange-shaped member 36 having an approximate outward flange shape for locking the external end of the guide member 34 is provided integrally to the portion near the opening of the case 31, and the guide member 34 is thereby internally provided as a result of being positioned in a required state inside the case 31. A cylindrical retaining portion 36a protruding upward is formed at the center of this flange-shaped member 36, and this retaining portion 36a is constituted to retain the outer periphery of the piston 33 protruding from the guide member 34 in a freely slidable manner with required elasticity, and prevent the coolant from entering the inside of the case 31. Here, this flange-shaped member 36 is welded and fixed to the outward flange 31b provided to the opening of the case 31 via spot welding, laser welding, or other welding methods.

In FIG. 5, reference numeral 38 represents a coating portion formed from synthetic resin or rubber material having heat resistance, and this coating portion 38 is formed from the front face including the retaining portion 36a of the flange-shaped member 36 to the back face upon being folded back at the outer periphery portion. The outer periphery portion of this flange-shaped member 36 functions as the first valve disc 22 for opening and closing the first fluid channel, and sits on the valve seat 26b of the cap 26 when the valve is closed.

The thermoelement 21 having the foregoing constitution eliminates the problems encountered by sleeve-type or diaphragm-type thermoelements which were conventionally standard, enables the minimum number of components and reduction of costs, and, in addition, a reciprocating motion of the piston in a required stroke can be obtained based on the volume change pursuant to the expansion and contraction of the thermal expansion body, and it is possible to obtain a thermoelement superior in responsiveness and durability. Further, with the thermoelement 21 described above, the shape and structure of the case 31, guide member 34 and so on can be simplified even more, and there is an advantage in that a further effect can be yielded in terms of workability, assemblability and cost reduction.

In this kind of thermoelement 21, according to the present invention, the temperature sensor, which is the bottomed portion at the tip of the case 31 with wax 32 filled therein, is used as the second valve disc 23. In other words, as shown in FIG. 1 and FIG. 2, a cylindrical portion for retaining the lower end portion of the case 31 of the thermoelement 21 in a freely slidable manner is provided integrally to the lower end of the frame 25. And, the constitution is such that the tip side of this cylindrical portion 41 is connected to the second fluid channel (bypass channel 3c side) such that the fluid of the second fluid channel will flow inside the cylindrical portion 41.

Further, an opening 42 for opening and closing the second valve disc 23 based on the other end of the thermoelement 21 is provided as a window to a part of this cylindrical portion 41.

Here, as a result of providing this kind of cylindrical portion 41 integrally with the frame 25, members constituting the second valve can be kept to a minimum, and the overall number of components can be reduced. Moreover, as a result of inserting the tip of this cylindrical portion 41 into the passage hole of the housing constituting the second fluid channel (bypass channel 3c side), the inside of the cylindrical portion 41 will become the second fluid channel, and the effect of reducing the number of components in comparison to conventional devices is exhibited.

In the thermostat device 20 having the foregoing constitution, when the coolant temperature is low, as shown in FIG. 1, FIG. 3 and FIG. 4, the piston 33 faces inside the wax 32 and the relative amount of protrusion thereof in relation to the case 31 is small. Here, the thermoelement 21 is biased upward in the diagram due to the biasing force of the coil spring 24, and the first valve disc 22 will be in a valve-closing position, and the second valve disc 23 will be in a valve-opening position.

Here, the coolant from the bypass channel 3c flows into the engine inlet 1b via the second fluid channel, and returns to the engine 1.

When the coolant temperature becomes high, such condition is conveyed to the temperature sensor of the thermoelement 21 inside the cylindrical portion 41, and the wax 32 expands and pushes the piston 33. Here, since the piston 33 is locked with the cap 26, the case 31 and the like of the thermoelement 21 will relatively move downward, and the second valve disc 23 at the lower end thereof will close the opening 42, and the first valve disc 22 will open the valve.

As a result of employing the foregoing constitution, flow of the coolant from the bypass channel 3c will become small, and the coolant cooled via the radiator 2 side will be sent to the engine 1 side.

According to the foregoing constitution, since the valve for opening and closing the second fluid channel (bypass channel 3c side) is constituted with the frame 25 and thermoelement 21 of the thermostat device 20, the number of components is few, the assemblability and workability are superior, and costs can be reduced.

Further, since the second valve for opening and closing the second fluid channel (bypass channel 3c side) is constituted with the cylindrical portion 41 provided integrally with the device frame 25, and the tip of the cylindrical portion 41 is connected to the bypass channel 3c such that the fluid on the second fluid channel side will only flow inside the cylindrical portion 41, the fluid pressure caused by the fluid flow to be added from the lateral direction to the thermoelement 21 will be small, and biased abrasion can be reduced.

Moreover, since the fluid passing through the foregoing valve portion will always pass through the temperature sensor in the thermoelement 21, the fluid will be mixed reliably, and, since the required temperature can be sensed, a disadvantage such as temperature hunting can be avoided, and the fluid temperature can be controlled in a required state. In addition, since the flow of fluid can be controlled with the cylindrical portion 41, the control plate employed in a convention device described above is no longer required, and the number of components can be reduced thereby.

Further, in addition to being able to simplify the structure of the thermoelement 21 and reduce the number of components, since the flange-shaped member 36 as the first valve disc is directly provided to the thermoelement 21 via welding or the like, the processing precision of the respective components can be secured, and it is also possible to seek the reduction of the number of components, improvement in the assemblability and workability, and reduction of costs.

Incidentally, the present invention is not limited to the constitution explained in the embodiments described above, and the shape, structure and the like of the respective components may be suitably modified or changed as a matter of course.

For example, in the foregoing embodiments, although an explanation was provided where the thermostat device 10 is built in the inlet 1b side of the engine in an engine coolant circuit, the present invention is not limited thereto, and, needless to say, the same effects can also be obtained when the [thermostat device] is built in the outlet 1c side of the engine 1. Here, the flow of fluid (coolant) will be reverse.

Moreover, although a case was explained in the foregoing embodiments of a thermoelement 21 having a constitution where the wax 32, seal member 35 and guide member 34 are built in the case 31 having an approximately identical diameter size, and fixing to the case 31 the flange-shaped member 36 as the locking member for locking the foregoing components at the case opening via welding, the present invention is not limited thereto, and, needless to say, an operating member of a thermoelement having a similar structure may also be employed. For instance, the flange-shaped member 36 to be the first valve disc 22 may be integrally formed at the case 31 side. In such a case, a locking member for locking the members built in the case 31 may be separately provided.

INDUSTRIAL APPLICABILITY

As described above, according to the thermostat device pertaining to the present invention, since the valve for opening and closing the first fluid channel (main passage side) is constituted with the device frame of the thermostat device and the flange-shaped member of the thermoelement, and the flange-shaped member is constituted as the first valve disc, a superior effect is yielded in that the structure of the overall device can be simplified, the number of components can be significantly reduced, the assemblability and workability can be improved, and costs can be significantly reduced.

Here, according to the present invention, since the flange-shaped member provided at the opening end of the thermoelement is used as the first valve disc, unlike a conventional first valve disc that was fixed via press fitting or the like to the outer periphery of the element case, the operation of such press fitting can be omitted, and, since the processing precision for the press fitting or the strength for the press fitting will no longer be necessary, there is an advantage in that the material of the case can be made thin.

Further, according to the present invention, since the frame of the thermostat device and the thermoelement constitute the valve for opening and closing the second fluid channel (bypass channel side), and one end of the thermoelement constitutes the second valve disc, a superior effect is yielded in that the structure of the overall device can be simplified, the number of components can be significantly reduced, the assemblability and workability can be improved, and costs can be significantly reduced.

Here, according to the present invention, since the valve for opening and closing the second fluid channel (bypass channel side) is constituted with a cylindrical portion provided integrally with the device frame, and the tip of the cylindrical portion is connected to the bypass channel such that the fluid from the second fluid channel will only flow inward (or outward) inside the cylindrical portion, there is an advantage in that the fluid pressure caused by the fluid flow to be added from the lateral direction to the operating member will be small, biased abrasion can be reduced, and reliability of operation of the respective components can be secured.

Moreover, according to the present invention, since the fluid passing through the foregoing valve portion will always pass through the temperature sensor, the fluid will be mixed reliably, and, since the required temperature can be sensed, a disadvantage such as temperature hunting can be avoided, and the fluid temperature can be controlled in a required state. In addition, since the flow of fluid can be controlled with the cylindrical portion, effects are yielded in that the control plate employed conventionally for mixing the fluid is no longer required, the number of components can be reduced thereby, and costs can be reduced thereby.

Further, according to the present invention, in addition to being able to simplify the structure of the thermoelement and reduce the number of components, since the first valve disc is directly provided to the thermoelement integrally or via welding or the like, the processing precision of the respective components can be secured, and it is also possible to seek the reduction of the number of components, improvement in the assemblability and workability, and reduction of costs.

The invention claimed is:

1. A thermostat device comprising:
   a first valve disc for opening and closing a first fluid channel;
   a second valve disc for opening and closing a second fluid channel; and
   an operating member which operates in accordance with a temperature change of a fluid and in conjunction with the first and second valve discs to move integrally such that one of the first fluid channel and second fluid channel is opened and the other one of the first fluid channel and second fluid channel is closed,
   wherein said operating member has a case which seals in one end side thereof a thermal expansion body having a property of expanding and contracting in accordance with a temperature change and a piston retained through an opening of the other end side thereof in a freely reciprocable manner, a cylindrical portion for retaining one end of the case constituting said operating member in a freely slidable manner is provided to a main frame of the thermostat device, an opening to be opened and closed at one end of said case is provided to a part of said cylindrical portion, and one end of said case is made to be said second valve disc.

2. A thermostat device according to claim 1, wherein the tip of said cylindrical portion is made to face the inside of a passage constituting said second fluid channel, and the inside of said cylindrical portion is made to be a part of the second fluid channel.

3. A thermostat device according to claim 1, wherein one end of said operating member is a temperature sensor which makes said operating member operate in accordance with the temperature of the fluid.

4. A thermostat device comprising:

a main frame;

first valve means for opening and closing a first fluid channel;

second valve means for opening and closing a second fluid channel; and an operating member which operates in accordance with a temperature change of a fluid and in conjunction with the first and second valve means to move integrally such that one of the first fluid channel and second fluid channel is opened and the other one of the first fluid channel and second fluid channel is closed, wherein said operating member has a case which seals in one end side thereof a thermal expansion body having a property of expanding and contracting in accordance with a temperature change and a piston retained through an opening of the other end side thereof in a freely reciprocable manner, the main frame has a cylindrical portion for retaining one end of the case of said operating member in a freely slidable manner, and said cylindrical portion has an opening to be opened and closed by the one end of said case.

* * * * *

UNITED STATES PATENT AND TRADEMARK OFFICE
CERTIFICATE OF CORRECTION

| | | |
|---|---|---|
| PATENT NO. | : 7,445,161 B2 | Page 1 of 1 |
| APPLICATION NO. | : 10/518087 | |
| DATED | : November 4, 2008 | |
| INVENTOR(S) | : Inoue | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 520 days.

Delete the phrase "by 520 days" and insert -- by 844 days --

Signed and Sealed this

Eighteenth Day of May, 2010

David J. Kappos
*Director of the United States Patent and Trademark Office*